United States Patent
Van Der Auwera et al.

(10) Patent No.: US 9,532,057 B2
(45) Date of Patent: Dec. 27, 2016

(54) INTER-LAYER PREDICTION USING SAMPLE-ADAPTIVE ADJUSTMENTS FOR BIT DEPTH SCALABLE VIDEO CODING

(71) Applicant: QUALCOMM Incorporated, San Diego, CA (US)

(72) Inventors: Geert Van Der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 14/137,031

(22) Filed: Dec. 20, 2013

(65) Prior Publication Data

US 2014/0185664 A1    Jul. 3, 2014

Related U.S. Application Data

(60) Provisional application No. 61/746,906, filed on Dec. 28, 2012.

(51) Int. Cl.
*H04N 7/12*    (2006.01)
*H04N 19/103*    (2014.01)
(Continued)

(52) U.S. Cl.
CPC .......... *H04N 19/103* (2014.11); *H04N 19/136* (2014.11); *H04N 19/182* (2014.11);
(Continued)

(58) Field of Classification Search
CPC .... H04N 19/103; H04N 19/50; H04N 19/196; H04N 19/136; H04N 19/182; H04N 19/187; H04N 19/33
See application file for complete search history.

(56) References Cited

U.S. PATENT DOCUMENTS

| | | | |
|---|---|---|---|
| 7,095,782 B1 * | 8/2006 | Cohen | H04N 21/234327 348/410.1 |
| 2006/0233254 A1 * | 10/2006 | Lee | H04N 19/70 375/240.16 |

(Continued)

FOREIGN PATENT DOCUMENTS

WO    WO-2008071037 A1    6/2008

OTHER PUBLICATIONS

Bross, B., et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, Document: JCTVC-K1003_v4, 287 pp.

(Continued)

*Primary Examiner* — Tat Chio
(74) *Attorney, Agent, or Firm* — Knobbe, Martens, Olson & Bear, LLP

(57) ABSTRACT

An apparatus for coding video data according to certain aspects includes a memory unit and a processor in communication with the memory unit. The memory unit stores video data. The video data may include a base layer comprising samples with a lower bit depth and an enhancement layer comprising samples with a higher bit depth. The processor predicts the values of samples in the enhancement layer based on the values of samples in the base layer. The prediction performed by the processor includes applying a preliminary mapping to the base layer samples to obtain preliminary predictions, and then applying adaptive adjustments to the preliminary predictions to obtain refined predictions. Parameters used for the adaptive adjustments may depend on the values and distribution of base layer samples. The processor may encode or decode the video data.

30 Claims, 6 Drawing Sheets

(51) Int. Cl.
H04N 19/50 (2014.01)
H04N 19/196 (2014.01)
H04N 19/136 (2014.01)
H04N 19/182 (2014.01)
H04N 19/187 (2014.01)
H04N 19/33 (2014.01)

(52) U.S. Cl.
CPC ......... *H04N 19/187* (2014.11); *H04N 19/196* (2014.11); *H04N 19/33* (2014.11); *H04N 19/50* (2014.11)

(56) References Cited

U.S. PATENT DOCUMENTS

| | | | | |
|---|---|---|---|---|
| 2009/0074060 | A1* | 3/2009 | Kim | H04N 21/234327 375/240.12 |
| 2009/0285283 | A1* | 11/2009 | Gao | G06T 5/009 375/240.08 |
| 2010/0046612 | A1 | 2/2010 | Sun et al. | |
| 2010/0128786 | A1* | 5/2010 | Gao | H04N 19/147 375/240.13 |
| 2010/0260260 | A1* | 10/2010 | Wiegand | H04N 19/30 375/240.12 |
| 2014/0092977 | A1* | 4/2014 | Lainema | H04N 19/50 375/240.16 |
| 2015/0237376 | A1* | 8/2015 | Alshina | H04N 19/65 375/240.02 |

OTHER PUBLICATIONS

Chen, J., et al., "Description of Tool Experiment B4: Inter-layer filtering," Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, Document: JCTVC-K1104, pp. 1-11.

Gao, Y., et al., "Applications and Requirement for Color Bit Depth Scalability," Joint Video Team (JVT) of ISO/IEC MPEG & ITU-T VCEG (ISO/IEC JTC1/SC29/WG11 and ITU-T SG16 Q.6), 21st Meeting: Hangzhou, China, Oct. 20-27, 2006, Document: JVT-U049, pp. 1-10.

International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.

Kerofsky, L., et al., "Color Gamut Scalable Video Coding," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, Document: JCTVC-K-0241, pp. 1-11.

Mai, Z., et al., "Optimizing a Tone Curve for Backward-Compatible High Dynamic Range Image and Video Compression," IEEE Transactions on Image Processing vol. 20, No. 6, Jun. 2011, pp. 1558-1571.

International Search Report and Written Opinion—PCT/US2013/077473—ISA/EPO—Jul. 29, 2015.

Winken M., et al., "Bit-Depth Scalable Video Coding", Image Processing, 2007. ICIP 2007. IEEE International Conference on, IEEE, PI, Sep. 1, 2007 (Sep. 1, 2007), pp. 1-5, XP031157664.

* cited by examiner

INTER-LAYER PREDICTION USING SAMPLE-ADAPTIVE ADJUSTMENTS FOR BIT DEPTH SCALABLE VIDEO CODING

CROSS-REFERENCE TO RELATED APPLICATIONS

This application claims priority to U.S. Provisional No. 61/746,906, filed Dec. 28, 2012, which is hereby incorporated by reference in its entirety.

TECHNICAL FIELD

This disclosure generally relates to the field of video coding and compression, and more particularly, to techniques for inter-layer prediction in scalable video coding (SVC).

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

Some block-based video coding and compression may use scalable techniques. Scalable video coding (SVC) refers to video coding in which a base layer (BL), sometimes referred to as a reference layer (RL), and one or more scalable enhancement layers (ELs) are used. For SVC, the base layer can carry video data with a base level of quality. The one or more enhancement layers can carry additional video data to support higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a layer in the middle may be an EL for the layers below it, such as the base layer or any intervening enhancement layers, and at the same time serve as a RL for one or more enhancement layers above it. Similarly, in the Multi-view or 3D extension of the HEVC standard, there may be multiple views, and information of one view may be utilized to code (e.g., encode or decode) the information of another view (e.g., motion estimation, motion vector prediction and/or other redundancies). In some cases, the base layer may be transmitted in a manner that is more reliable than the transmission of enhancement layers. Techniques for SVC may also use inter-layer prediction to reduce or remove redundancy between base layers and enhancement layers. Inter-layer prediction generates predicted enhancement layer blocks from corresponding base layer blocks. Enhancement layer blocks may be coded using a predicted block generated from a base layer, along with residual data indicating the difference between the predicted block and the block to be coded. This residual data, like the residual data associated with spatial prediction and temporal prediction, may be transformed, quantized, and entropy encoded.

SUMMARY

High dynamic range (HDR) sequences are used in professional production environments, and high-quality displays that can reproduce 10-bit or higher content are available. One way of representing and distributing such HDR content is to generate a bitstream with a single-layer encoder. For example, a 10-bit content may be encoded with a single-layer encoder such as HEVC or H.264/AVC (e.g., in the High 10 profile). In such a case, only a 10-bit display will be able to reproduce the decoded content, while a legacy 8-bit display will require a down conversion of the 10-bit content to 8-bit, which nevertheless requires a 10-bit capable decoder. The legacy 8-bit decoders will not be able to decode the 10-bit bitstream. In this example, if both 8-bit and 10-bit displays require access to the same HDR video content, the HDR video content may be simulcast in separate bitstreams (e.g., an 8-bit bitstream and a 10-bit bitstream) for the two displays. However, such approach has high bandwidth requirements because there may be a lot of redundant information in the two bitstreams.

Alternatively, a scalable bitstream may be generated by a scalable encoder. A scalable decoder may be capable of decoding the 10-bit video content from the scalable bitstream, while an 8-bit decoder may decode the 8-bit base layer while ignoring the information contained in the enhancement layer (e.g., information used to go from 8-bit to 10-bit). Alternatively, a bitstream extractor that is located at the server side or inside the network, for example, may extract the 8-bit base layer from the scalable bitstream.

Thus, by using SVC to generate a scalable bitstream that contains a base layer that can be decoded by a legacy decoder (e.g., 8-bit) to produce a video content having a lower bit depth (e.g., 8-bit), and one or more enhancement layers that can be decoded by a scalable decoder to produce a higher bid-depth video content (e.g., 10-bit), backwards compatibility with legacy decoders may be provided, and the bandwidth requirements compared with simulcasting separate bitstreams may be reduced, thereby improving the coding efficiency and performance. Therefore, the techniques described in this disclosure may reduce computational complexity, improve coding efficiency, and/or improve overall coding performance associated with a method of coding video information.

The systems, methods and devices of this disclosure each have several innovative aspects, no single one of which is solely responsible for the desirable attributes disclosed herein.

One aspect of the disclosure provides an apparatus configured to code video data. The apparatus comprises a memory unit configured to store the video data. The video data may comprise a base layer and an enhancement layer. The base layer comprises video samples (also known as pixels) with a certain bit depth. The enhancement layer comprises samples having a higher bit depth than the video samples in the base layer. The samples in both the base layer and the enhancement layer may be grouped into video blocks, and a video block in the base layer will generally correspond to one or more video blocks in the enhancement layer, although the dimensions of the blocks may vary within each layer and between different layers.

The apparatus further comprises a processor in communication with the memory unit, the processor configured to determine, based on video samples associated with the base layer, predicted video samples for the enhancement layer. The processor may determine the predicted video samples for the enhancement layer by first applying a preliminary mapping function to the video samples from the base layer to determine preliminary predictions, and then applying adaptive adjustments to the preliminary predictions to determine refined predictions. The processor may apply different adaptive adjustments for different categories of base layer samples.

In some embodiments, the preliminary mapping function may comprise to a non-linear mathematical function that maps base layer samples to predicted enhancement layer samples by calculating, e.g., a logarithm or exponentiation of the base layer sample. In other embodiments, the preliminary mapping function may not be used at all, or may simply use the base layer sample as the preliminary prediction of the enhancement layer sample. In some embodiments, the adaptive adjustments may comprise ratios or coefficients by which the preliminary predictions are multiplied in order to determine the refined predictions. Additionally or alternatively, the adjustments may comprise offsets that are added to the preliminary prediction in order to determine the refined predictions. In some embodiments, the adaptive adjustments may depend on categories such as intensity ranges of individual samples or patterns of adjacent samples.

In some embodiments, the bit depth of the base layer samples may be 8 bits, and the bit depth of the enhancement layer samples may be 10 bits. The base layer samples may be assigned one or more categories based on one or more luminance or chrominance values of the base layer samples and/or other samples in the video data.

Another aspect of the disclosure provides a method for coding video data. The method comprises determining predicted samples for an enhancement layer based on samples associated with a base layer of video data. The predicted video samples for the enhancement layer may be determined by first applying a preliminary mapping function to the video samples from the base layer to determine preliminary predictions, and then applying adaptive adjustments to the preliminary predictions to determine refined predictions. Different adaptive adjustments may be applied for different categories of base layer samples.

Another aspect of the disclosure provides a non-transitory computer readable medium comprising code that, when executed, causes an apparatus to determine predicted samples for an enhancement layer based on samples associated with a base layer of video data. The apparatus may programmed to determine the predicted video samples for the enhancement layer by first applying a preliminary mapping function to the video samples from the base layer to determine preliminary predictions, and then applying adaptive adjustments to the preliminary predictions to determine refined predictions. The apparatus may be configured to apply different adaptive adjustments for different categories of base layer samples.

Another aspect of the disclosure provides a video coding device that codes video data. The device includes a means for determining predicted video samples for an enhancement layer based on video samples associated with a base layer of video data. The device may include means for applying a preliminary mapping function to the video samples from the base layer to determine preliminary predictions, and means for applying adaptive adjustments to the preliminary predictions to determine refined predictions. The device may apply different adaptive adjustments for different categories of base layer samples.

Disclosed apparatuses, methods, computer-readable media, and devices may also include components, steps, modules, or functionality to determine adaptive adjustments for various categories of base layer samples by performing calculations to minimize one or more measures of error or distortion associated with the predicted samples that are produced by application of the adaptive adjustments to the base layer samples. The measures of error may include, e.g., average error, mean square error, or computationally efficient approximations of either.

The details of one or more examples are set forth in the accompanying drawings and the description below. Other features, objects, and advantages will be apparent from the description and drawings, and from the claims.

DETAILED DESCRIPTION

Figure 1:
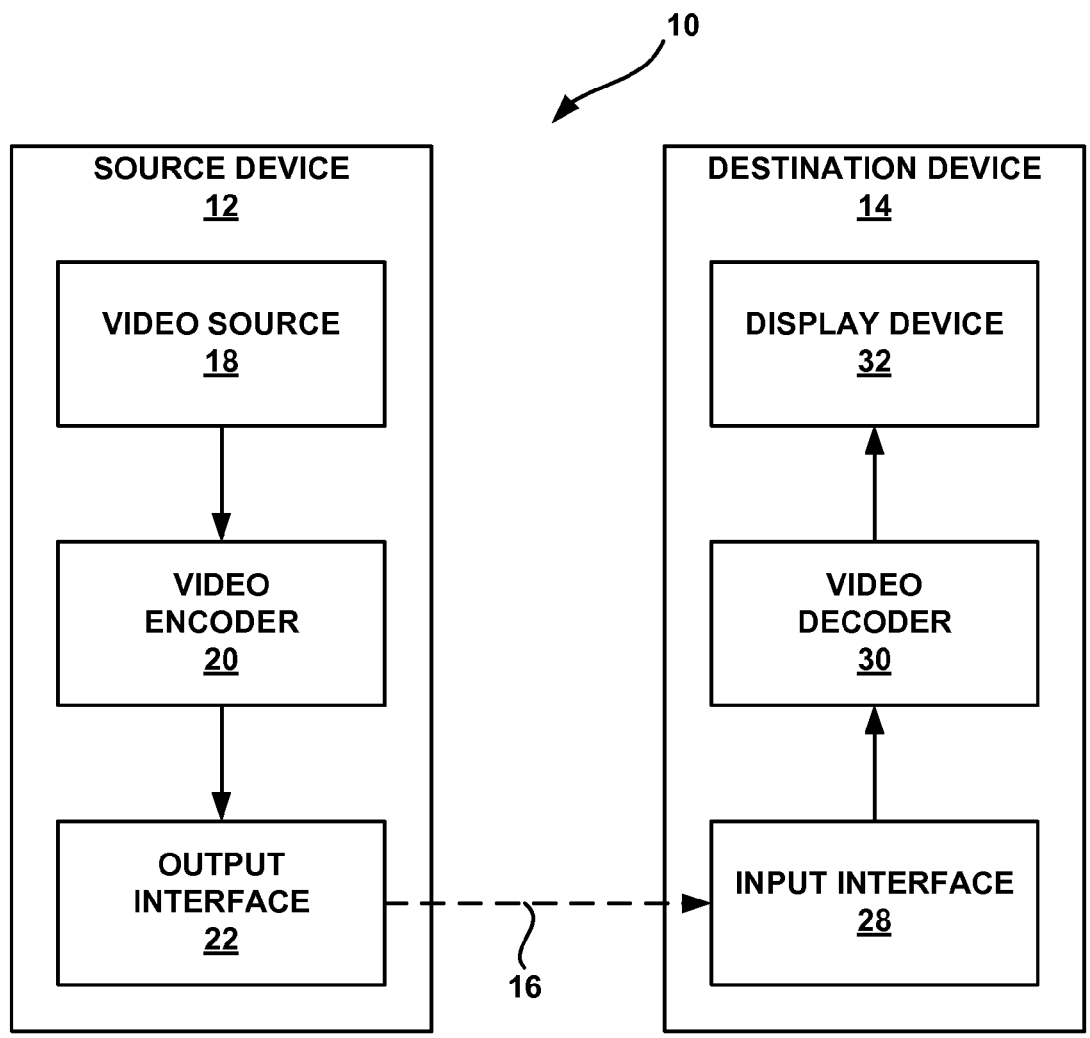
FIG. 1 is a block diagram illustrating an example of a video encoding and decoding system that may utilize techniques in accordance with aspects described in this disclosure.

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from that in certain previous video coding standards (e.g., macroblock). In fact, the concept of macroblock does not exist in HEVC as understood in certain previous video coding standards. Macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but it does not restrict the maximum size and may allow recursive splitting into four equal size CUs to improve the content adaptivity. PU may be considered the basic unit of inter/intra prediction and it may contain multiple arbitrary shape partitions in a single PU to effectively code irregular image patterns. TU may be considered the basic unit of transform. It can be defined independently from the PU; however, its size may be limited to the CU to which the TU belongs. This separation of the block structure into three different concepts may allow each to be optimized according to its role, which may result in improved coding efficiency.

For purposes of illustration only, certain embodiments disclosed herein are described with examples including only two layers (e.g., lower level layer such as the base layer, and a higher level layer such as the enhancement layer). It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions, all of which are incorporated by reference in their entireties.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.it-sudparis.eu/jct/do-c_end_user/documents/12_Geneva/wg11/JCTVC-L1003-v34.zip, as of Nov. 22, 2013, which is incorporated by reference in its entirety. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop, etc.) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website, etc.), FTP servers, network attached storage (NAS) devices, and local disk drives. Destination device 14 may access the encoded video data through any standard data connection, including an Internet connection. Example types of data connections may include wireless channels (e.g., Wi-Fi connections, etc.), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may be configured to encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. The syntax elements may describe characteristics and/or processing of blocks and other coded units, e.g., groups of pictures (GOPs). Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPS), sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more video coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video coder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2:
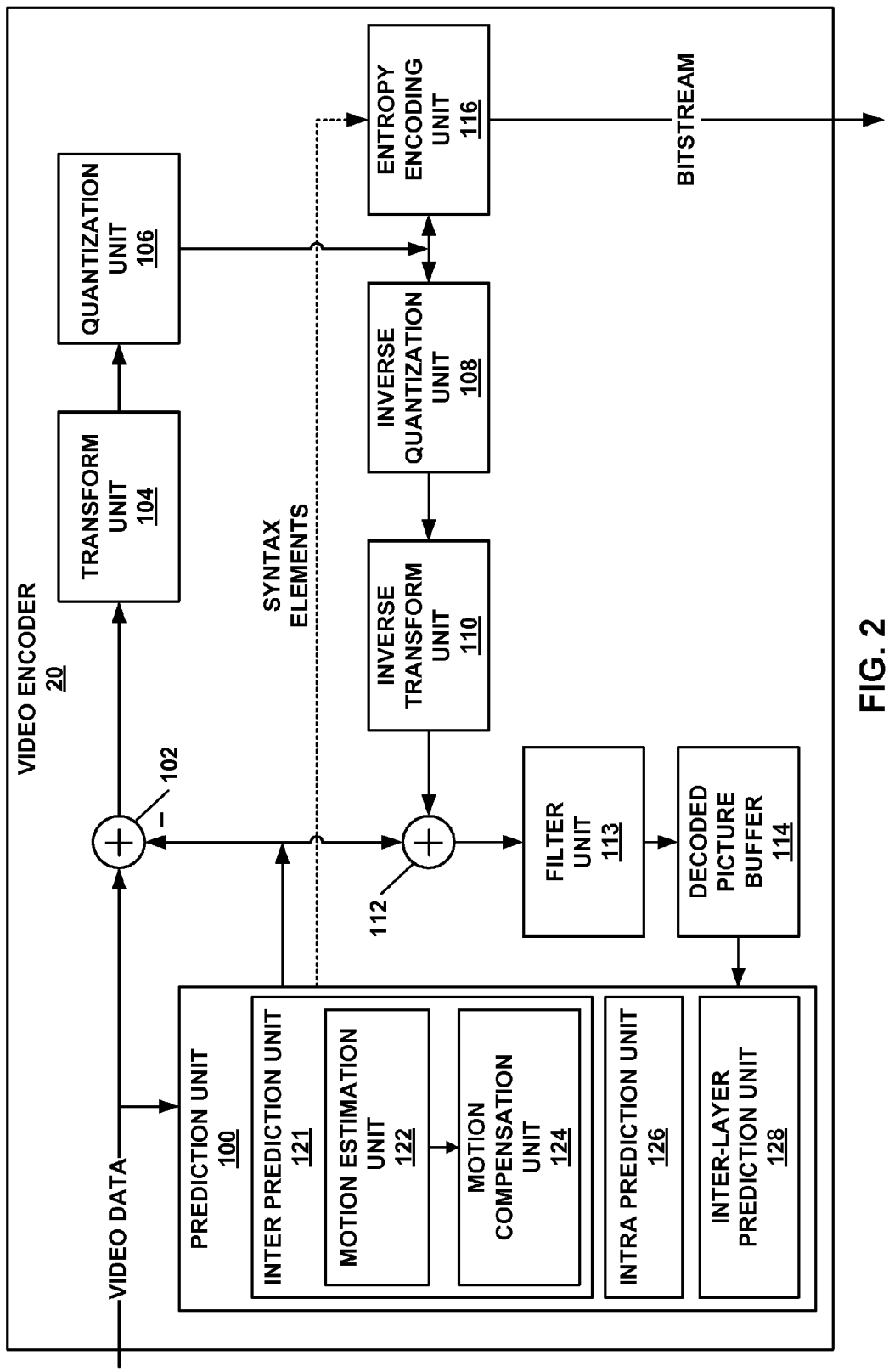
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, prediction unit 100 may be configured to perform any or all of the techniques described in this disclosure. In another embodiment, the video encoder 20 includes an optional inter-layer prediction unit 128 that is configured to perform any or all of the techniques described in this disclosure. In other embodiments, inter-layer prediction can be performed by prediction unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure. As further discussed below with reference to FIG. 6, one or more components of the video encoder 20 may be configured to perform the method illustrated in FIG. 6. For example, inter prediction unit 121 (e.g., via motion estimation unit 122 and/or motion compensation unit 124), intra prediction unit 126, or inter-layer prediction unit 128 may be configured to perform the method illustrated in FIG. 6, either together or separately.

In some instances, video encoder 20 can be considered to be the same as video encoder 400 (discussed below) shown in FIG. 4, but with different aspects of the video encoder emphasized in the respective figures. Specifically, the illustration of video encoder 20 of FIG. 1 focuses on features relating to block-based encoding generally, while the illustration of video encoder 400 in FIG. 4 focuses more specifically on features related to scalable video coding and inter-layer prediction of EL samples with increased bit depth. In some examples, the techniques described in this disclosure may be shared among the various components of video encoder 20 and video encoder 400. In some examples, in addition to or instead of, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2, video encoder 20 includes a plurality of functional components. The functional components of video encoder 20 include a prediction unit 100, a residual generation unit 102, a transform unit 104, a quantization unit 106, an inverse quantization unit 108, an inverse transform unit 110, a reconstruction unit 112, a filter unit 113, a decoded picture buffer 114, and an entropy encoding unit 116. Prediction unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction unit 100 may perform quadtree partitioning on the video block of the treeblock to divide the video block into progressively smaller video blocks. Each of the smaller video blocks may be associated with a different CU. For example, prediction unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction unit 100 may generate a hierarchical quadtree data structure for the treeblock. For example, a treeblock may correspond to a root node of the quadtree data structure. If prediction unit 100 partitions the video block of the treeblock into four sub-blocks, the root node has four child nodes in the quadtree data structure. Each of the child nodes corresponds to a CU associated with one of the sub-blocks. If prediction unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction unit 100 may select the prediction data for a PU from among the prediction data generated by motion compensation unit 124 for the PU or the prediction data generated by intra prediction unit 126 for the PU. In some examples, prediction unit 100 selects the prediction data for the PU based on rate/distortion metrics of the sets of prediction data.

If prediction unit 100 selects prediction data generated by intra prediction unit 126, prediction unit 100 may signal the intra prediction mode that was used to generate the prediction data for the PUs, e.g., the selected intra prediction mode. Prediction unit 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

After prediction unit 100 selects the prediction data for PUs of a CU, residual generation unit 102 may generate residual data for the CU by subtracting (e.g. indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform unit 104 may generate one or more transform coefficient blocks for each TU of a CU by applying one or more transforms to a residual video block associated with the TU. Each of the transform coefficient blocks may be a 2D matrix of transform coefficients. Transform unit 104 may apply various transforms to the residual video block associated with a TU. For example, transform unit 104 may apply a discrete cosine transform (DCT), a directional transform, or a conceptually similar transform to the residual video block associated with a TU.

After transform unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction unit 100. When entropy encoding unit 116 receives the data, entropy encoding unit 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Video Decoder

Figure 3:
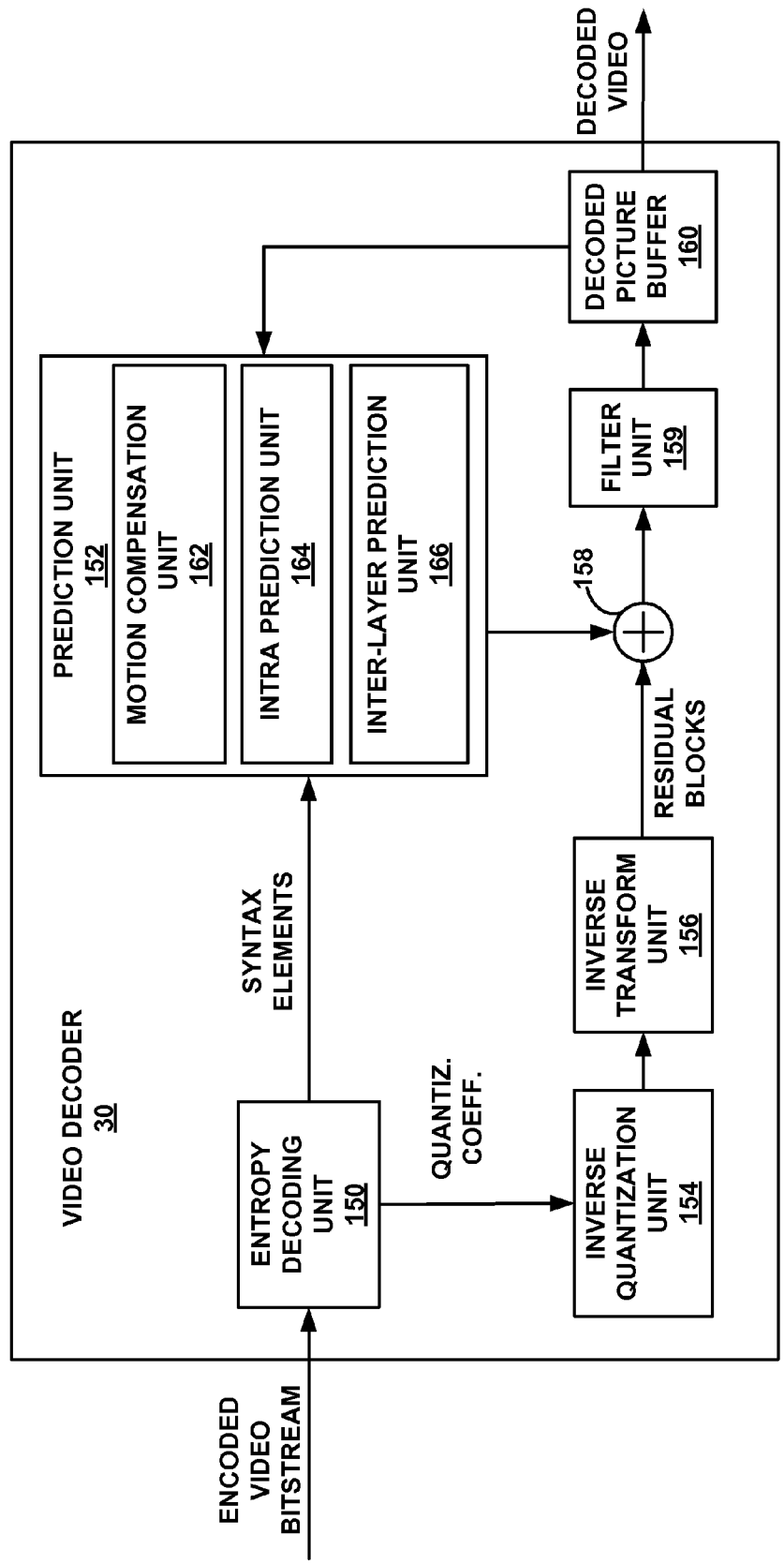
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure. As further discussed below with reference to FIG. 6, one or more components of the video decoder 30 may be configured to perform the method illustrated in FIG. 6. For example, motion compensation unit 162, intra prediction unit 164, or inter-layer prediction unit 166 may be configured to perform the method illustrated in FIG. 6, either together or separately.

In the example of FIG. 3, video decoder 30 includes a plurality of functional components. The functional components of video decoder 30 include an entropy decoding unit 150, a prediction unit 152, an inverse quantization unit 154, an inverse transform unit 156, a reconstruction unit 158, a filter unit 159, and a decoded picture buffer 160. Prediction unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Scalable Video Coding (SVC) and Bit Depth Scaling

As discussed above, scalable video coding (SVC) may be used to provide quality scalability (e.g., signal-to-noise ratio (SNR) scalability, spatial scalability, temporal scalability, bit depth scalability, color gamut scalability, or dynamic range scalability). An enhanced layer may comprise samples that have higher bit depths than corresponding base layer samples. For example, samples in an enhancement layer may have a bit depth of 10 bits, while corresponding samples in a base layer may have a bit depth of 8 bits. Each additional bit added to the bit depth of a sample doubles the number of discrete values that the sample can represent. Thus, the number of discrete values that can be represented by a 10-bit sample is four times larger than the number of discrete values that can be represented by an 8-bit sample. Of course, base layer samples may have bit depths other than 8 bits, and enhancement layer samples may have bit depths other than 10 bits. For luminance samples, additional bit depth in the enhancement layer allows for coding of high dynamic range (HDR) video, supporting increased contrast between the darkest and lightest parts of a video image. For chrominance samples, additional bit depth in the enhancement layer allows for coding of video comprising a wider variety of colors.

Some implementations of SVC may include prediction of samples or blocks in the enhancement layer based on samples or blocks in the base layer. Prediction of this sort may be referred to as inter-layer prediction, and it may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of corresponding blocks or samples in the base layer to predict blocks or samples in the enhancement layer. Inter-layer motion prediction uses motion information of the base layer to predict motion information in the enhancement layer. Inter-layer residual prediction uses the residue of the base layer to predict the residue of the enhancement layer.

Inter-layer prediction may be used in accordance with aspects of the present disclosure to predict higher bit depth samples in an enhancement layer using lower bit depth samples in a base layer. In some cases, an enhancement layer sample may be predicted from a base layer sample by a simple operation such as multiplication by a constant or a left bit shift. A left bit shift is equivalent to multiplication by a factor of 2, and involves the addition of one or more bits to the end of the base layer sample, thereby raising its bit depth. Although simple operations of this sort may suffice for some cases, they may not provide good results for other applications.

The usefulness of simple operations for predicting enhancement layer samples from base layer samples depends on the relationship of the sample representations used by the respective layers. Simple operations may provide poor prediction, for instance, when enhancement layer samples represent different chromaticity components than base layer samples, e.g., when base layer samples are represented in accordance with BT.709 and enhancement layer samples are represented in accordance with BT.2020 (both of which are defined by ITU-R, the International Telecommunication Union—Radiocommunication Sector). Simple operations may also provide poor prediction when base layer samples represent luminance values with different gamma nonlinearity than enhancement layer samples, or when samples in one layer represent luminance values on a linear scale while samples in another layer represent samples on a non-linear scale. As used in this specification, the term non-linear scale has its common meaning, and also refers to scales which are partially linear and partially non-linear, scales composed of a plurality of different linear components, and equivalents thereof.

In some embodiments, the enhancement layer samples may be predicted based on the base layer samples by using a look-up table which maps each possible base layer sample value onto the corresponding enhancement layer sample value.

Prediction quality may depend not only on the range of possible chrominance and luminance values that can be represented by samples in each layer, but on the distribution of actual sample values in the particular video that is coded. For instance, the sample representation used by the enhancement layer may map linearly to the sample representation used by the base layer, but the distribution of actual samples may not be spread uniformly across the full range of possible values. Rather, the actual samples may be clustered at certain parts of the scale. In this situation, better results may be obtained by skewing predictions towards the parts of the scale where samples are clustered.

Embodiments according to aspects of this disclosure provide advantages for inter-layer prediction in scalable video coding, including prediction between layers with disparate sample representations and uneven distributions of sample values. Specific aspects are disclosed in further detail below with respect to accompanying figures.

Figure 4:
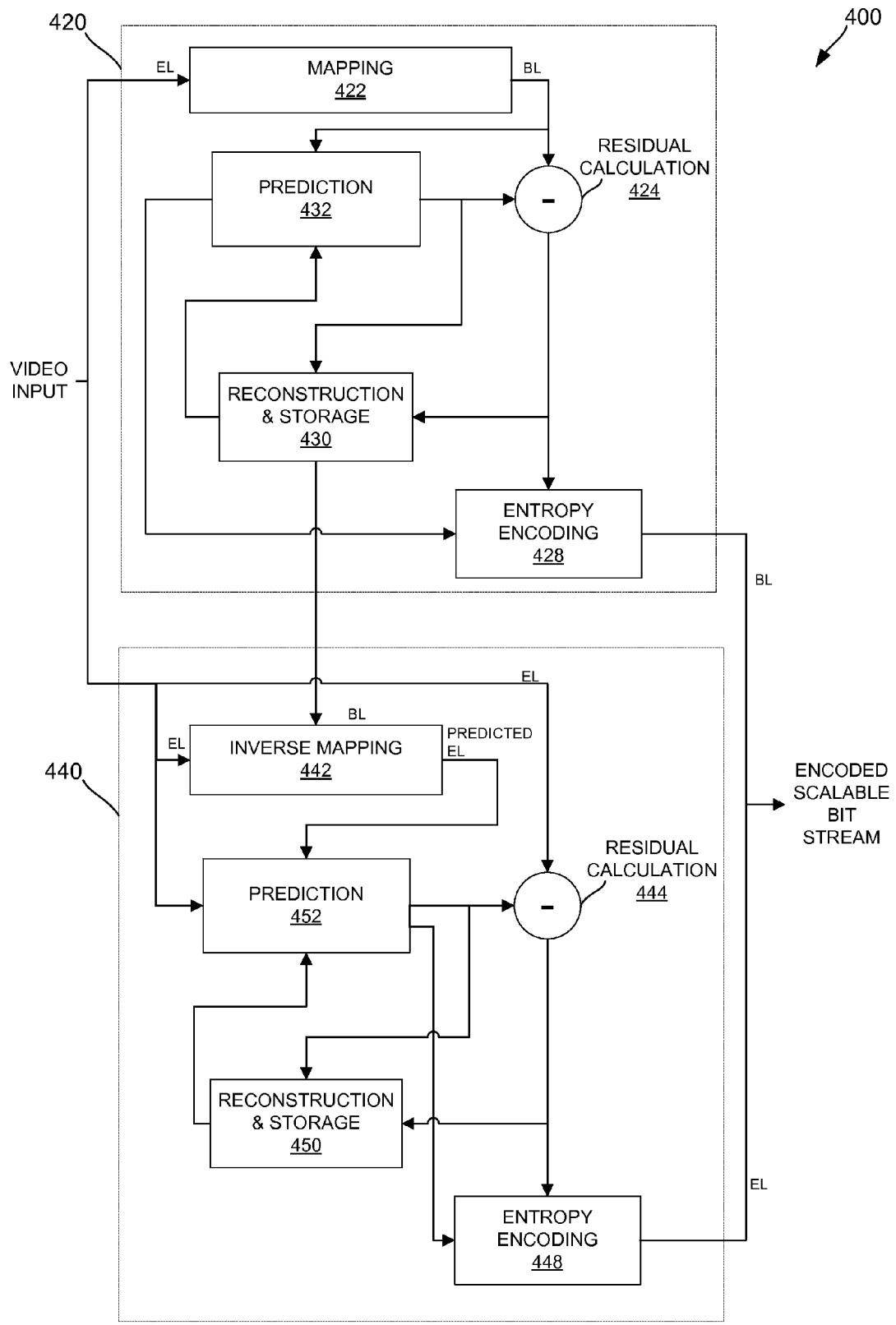
FIG. 4 is a block diagram illustrating an example scalable video encoder that may utilize techniques in accordance with aspects described in this disclosure.

FIG. 4 is a block diagram illustrating an example of a scalable video encoder that may implement techniques in accordance with aspects of this disclosure. Video encoder 400 of FIG. 4 may correspond to video encoder 20 of FIG. 1 and FIG. 2. However, the depiction of encoder 400 in FIG. 4 focuses on aspects related to scalable video coding and inter-layer prediction specifically rather than block-based video coding more generally.

In the example of FIG. 4, video encoder 400 is a scalable video encoder that includes BL subsystem 420, and EL subsystem 440. BL subsystem 420 encodes video data associated with a BL, and EL subsystem 440 encodes video data associated with an EL. The encoded video data produced by BL subsystem 420 may be decoded by itself to produce reconstructed video with a base level of quality. The encoded video data produced by EL subsystem 440 may be impossible to decode meaningfully on its own, but it may be decoded in combination with the BL data to produce reconstructed video with enhanced quality. In some embodiments, the video data associated with the BL may be compatible with older decoders, or decoders that do not have sufficient computational resources to effectively decode and present the combined, higher quality video. As depicted in FIG. 4, EL subsystem 440 encodes an EL that supports sample values with increased bit depth relative to the BL encoded by BL subsystem 420. Samples with increased bit depth may enable presentation of video with, e.g., higher dynamic range or more varied colors.

BL subsystem 420 and EL subsystem 440 may be implemented in hardware, in software, or in combinations of hardware and software. Although BL subsystem 420 and EL subsystem 440 are depicted separately in FIG. 4 for conceptual purposes, they may share certain hardware components or software modules. For example, entropy encoding unit 428 in BL subsystem 420 may be implemented in the same hardware components or software modules as entropy encoding unit 448 of EL subsystem 440.

BL subsystem 420 includes mapping unit 422, residual calculation unit 424, entropy encoding unit 428, reconstruction and storage unit 430, and prediction unit 432. EL subsystem 440 includes inverse mapping unit 442, residual calculation unit 444, entropy encoding unit 448, reconstruction and storage unit 450, and prediction unit 452. Although the various constituent units of BL subsystem 420 and EL subsystem 440 are illustrated separately for conceptual purposes, they may be combined into fewer units or subdivided into additional units in some embodiments. Much of the functionality discussed below is present in both BL subsystem 420 and EL subsystem 440. A detailed example covering the common functionality shared by both subsystems has been discussed above with respect to video encoder 20 of FIG. 2. For the purposes of FIG. 4, discussion will focus on the aspects of video encoder 400 that allow the two subsystems to work together and generate scalable output.

During the encoding process, video encoder 400 receives video data to be encoded. Video data received as input may be processed by both BL subsystem 420 and EL subsystem 440. In BL subsystem 420, processing begins at mapping unit 422, where the samples in the video input are mapped from a higher EL bit depth to a lower BL bit depth. For example, the input to mapping unit 422 may comprise samples representing HDR video with a bit depth of, e.g., 10, 12 or 14 bits. The output of mapping unit 422 may then comprise samples representing LDR video with a lower bit depth such as 8 bits. Mapping unit 422 may calculate the values of the BL samples in various ways, such as by applying one or more arithmetic operations or mathematical functions to the EL samples. In some embodiments, mapping unit 422 may calculate BL samples by applying a piecewise linear function that applies different multiplicative factors to EL sample values lying in different ranges. In other embodiments, mapping unit 422 may calculate BL samples by applying a logarithmic function to the EL sample values. Moreover, mapping unit 422 can apply an inversion of any function that may be used in inverse mapping unit 442, discussed in further detail below with respect to EL subsystem 440. In some embodiments, however, there will be no clear correspondence between the operations applied by mapping unit 422 and inverse mapping unit 442, except that mapping unit 422 has the effect of decreasing bit depth and inverse mapping unit 442 has the effect of increasing bit depth. Mapping unit 422 may also apply a series of operations designed to approximate any mathematical function that would be impossible or impracticable to apply precisely. In some embodiments, mapping unit 422 may be configured to apply different arithmetic operations or mathematical functions to different EL samples based on criteria apart from or in addition to the value of each sample. For example, the criteria may depend on the position of the sample relative to a block or frame, the values of other EL samples in the same slice, syntax information, or configuration parameters. Regardless of the specific operations applied by mapping unit 422, the EL samples of the input video slice are converted to BL samples with a lower bit depth.

The BL samples produced by mapping unit 422 may be used by prediction unit 432 and residual calculation unit 424. Prediction unit 432 may support a variety of prediction modes, and it may compare the BL samples with predicted samples from several different modes in order to determine which of those modes will produce the best prediction for a particular video slice. Prediction unit 432 may also compare various partitioning options, e.g., by dividing video frames into different combinations of largest coding units (LCUs), coding units (CUs), and sub-CUs. In some embodiments, the various partitioning and prediction possibilities may be evaluated using rate-distortion analysis. The partitioning and mode selection processes applied by prediction unit 432 may be in accordance with those used by prediction unit 100 of FIG. 2. Examples of predictions that may be performed by prediction unit 432 are discussed above in further detail with respect to motion estimation unit 122, motion compensation unit 124, and intra prediction unit 126 of FIG. 2.

At residual calculation unit 424, encoder 400 calculates the difference between the actual BL samples determined by mapping unit 422 and any predicted samples generated from a previously processed video slice by prediction unit 432. The difference between an actual BL sample and a corresponding predicted sample may be referred to as a residual sample. Similarly, the difference between an actual block of samples and a corresponding predicted block may be referred to as a residual block. The residuals from residual calculation unit 424 may be transformed from the sample domain to an alternative domain, such as a frequency domain. The resulting transform coefficients may be quantized before being encoded by entropy encoding unit 428. Entropy encoding unit 428 also encodes syntax data from prediction unit 432. This syntax data describes the partitions and predictions that were used to calculate the residuals from which the quantized transform coefficients were derived. The output of entropy encoding unit 428 is encoded BL video, which becomes part of the scalable video bit stream produced by encoder 400. More detailed examples of transformation, quantization, and entropy encoding are provided above with respect to transform unit 104, quantization unit 106, and entropy encoding unit 116 of FIG. 2.

At reconstruction and storage unit 430, the transformation and quantization operations are reversed in order to reconstruct the residual values in the sample domain. The reconstructed residual values may be combined with the predicted samples that were used to determine the original residual values prior to transformation and quantization. The combination of the reconstructed residuals and the corresponding predictions yields a reconstructed video slice. The reconstructed video slice may include distortion introduced by the coding process, e.g., during transformation and quantization. More detailed examples of the reconstruction process are described above with respect to inverse quantization unit 108, inverse transform unit 110, and reconstruction unit 112 of FIG. 2.

Reconstruction and storage unit 430 may include a memory for storing video data from the reconstructed video slice. The reconstructed video data stored in the memory may be used as a basis for future rounds of prediction in BL subsystem 420 or EL subsystem 440. Encoder 400 makes predictions based on the reconstructed data (rather than the original data produced by mapping unit 422) in order to account for distortion introduced in the coding process and to ensure that the predictions made by the encoder can be reproduced using data that will be available to a decoder. Predictions may be performed, e.g., by prediction unit 432 or by inverse mapping unit 442. For example, the reconstructed video data may comprise a reference frame, and prediction unit 432 may predict subsequent frames using inter-frame prediction. The reconstructed video data may also comprise a reference block, and prediction unit 432 may predict adjacent blocks using intra-frame prediction. Encoder 400 may also perform inter-layer prediction, using inverse mapping unit 442, as discussed below with respect to EL subsystem 440. More detailed examples of the storage process are provided above with respect to decoded picture buffer 114 of FIG. 2; more detailed examples of various prediction schemes are discussed with respect to motion estimation unit 112, motion compensation unit 124, and intra prediction unit 126 of FIG. 2.

As described previously, encoder 400 includes BL subsystem 420 and EL subsystem 440. The output of BL subsystem 420 is sufficient by itself to produce video output with a base level of quality. The output of EL subsystem 440, on the other hand, includes only the information necessary to increase the quality of the rendered video from a base level of quality associated with the BL to a heightened level of quality associated with the EL. Moreover, the output of the EL subsystem may not directly represent the difference between the BL video and the EL video. Rather, it may represent the difference between the actual EL video and some predicted version of the EL video that is derived from the BL video. Thus, the output produced by the EL subsystem may be heavily dependent on the methodology that is employed for inter-layer prediction between the BL and the EL. Better prediction methodology will result in predictions which are closer to the actual EL video, which in turn will allow EL subsystem 140 to generate encodings with increased space efficiency or higher visual quality.

General considerations relevant to prediction of EL samples from BL samples were explained earlier in this Detailed Description section, prior to the discussion of the present FIG. 4. As explained above, simple operations such as multiplication by a constant or a left bit shift by a fixed number of bits may be used to predict EL samples from BL samples having a lower bit depth. These simple operations may be useful because they provide a straightforward means of increasing the bit depth of the BL samples to match the bit depth expected of EL samples. However, simple operations of this sort may provide poor prediction performance in situations where the scale used for EL samples is not directly proportional to the scale used for BL samples. In such situations, better predictions may be obtained by applying different operations to BL samples that lie on different parts of the BL scale. In other words, better results may be obtained by predicting EL samples based on adaptive adjustments to BL samples, rather than fixed or constant adjustments.

As explained above, inter-layer prediction performance depends not only on the respective scales used for BL and EL samples, but on how the individual samples are distributed with respect to those scales. Because the samples may not be evenly distributed, it may be beneficial to employ a prediction methodology that can adapt to different sample distributions. Specifically, if adaptive adjustments are used to predict EL samples from BL samples, the specific adjustment parameter chosen for a particular BL sample may advantageously depend not only on the value of the particular sample on the BL scale, but on the overall distribution of BL samples and the position of the particular sample with respect to that distribution. For some applications, exhaustive analysis of a complete sample distribution may not be computationally feasible, but heuristics may be used to determine adaptive parameters that account for at least some of the variance in a sample distribution.

As depicted in EL subsystem 440, inverse mapping unit 442 may be used for inter-layer prediction. More specifically, inverse mapping unit 442 may perform inter-layer prediction by applying adaptive adjustments of the sort described above. For example, inverse mapping unit 442 may multiply a reconstructed BL sample by a particular ratio to determine a predicted EL sample. The particular ratio may be adaptively selected by inverse mapping unit 442 depending on, e.g., the value of the BL sample as well as one or more heuristics related to the overall distribution of BL samples in the video slice to which the reconstructed sample belongs.

Inverse mapping unit 442 may be configured to choose a set of adaptive adjustment parameters that will minimize the error in the predicted EL samples. The error in the predicted samples may be measured, for example, by the average of the signed difference, the average of the absolute difference, or the average of the square difference between predicted samples and actual samples in a video slice. A computationally efficient approximation of any of these averages may also be used. In some embodiments, inverse mapping unit 442 may use rate distortion analysis to choose adjustment parameters and minimize the error in predicted samples. Once inverse mapping unit 442 determines the adaptive adjustment parameters, they may be transmitted to entropy encoding unit 448 in the form of syntax data, which may be used by, e.g., decoder 500 of FIG. 5 to perform inter-layer prediction while decoding EL video data.

Apart from the use of inter-layer prediction, EL subsystem 440 functions in a manner similar to BL subsystem 420. The inter-layer prediction functionality provided by inverse mapping unit 442 serves as an additional prediction mode that supplements the intra-picture and inter-picture prediction modes provided by prediction unit 452, which are the same modes provided by prediction unit 432 of BL subsystem 420. Prediction unit 452 may perform mode selection, described previously with respect to prediction unit 432, in order to select optimal prediction modes for various video slices. Mode selection is also described above in further detail with respect to prediction unit 100 of FIG. 2.

The remaining units of EL subsystem 440 function in the same manner as the corresponding units of BL subsystem 420, except that they operate on samples having a greater bit depth. So, residual calculation unit 444 calculates residuals representing the difference between predicted EL samples and actual EL samples. The residuals may be transformed to an alternate domain and the resulting coefficients may be quantized before being encoded by entropy encoding unit 448, along with syntax data from prediction unit 452. At reconstruction and storage unit 450, the quantized transform coefficients may be inverse quantized, inverse transformed, and combined with predictions from prediction unit 452 to form a reconstructed video slice. The reconstructed video slice may be used by prediction unit 452 as a basis for additional rounds of prediction. The output from EL subsystem 440 may be combined with the output from BL subsystem 420 to form an encoded scalable bit stream, which is the output of encoder 400.

Figure 5:
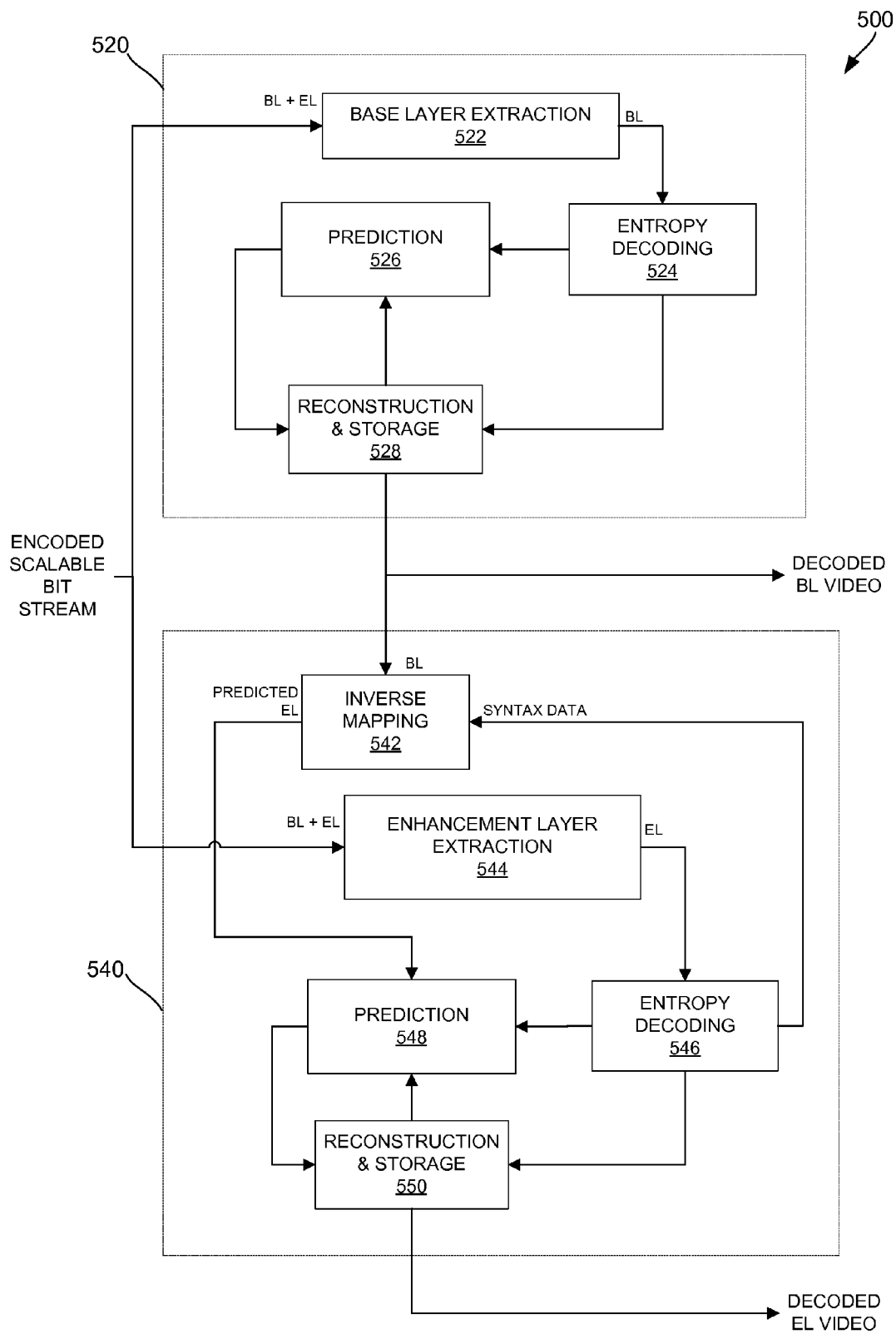
FIG. 5 is a block diagram illustrating an example of a scalable video decoder that may utilize techniques in accordance with aspects described in this disclosure.

FIG. 5 is a block diagram illustrating an example of a scalable video decoder that may implement techniques in accordance with aspects of this disclosure. Video decoder 500 of FIG. 5 may correspond to video decoder 30 of FIG. 1 and FIG. 3. However, the depiction of decoder 500 in FIG. 5 focuses on aspects related to scalable video coding and inter-layer prediction specifically rather than block-based video coding more generally.

In the example of FIG. 5, video decoder 500 is a scalable video decoder that includes BL subsystem 520, and EL subsystem 540. Video decoder 500 may perform a decoding process that is generally reciprocal to the encoding process performed by video encoder 400, as described in FIG. 4. Decoder 500 may receive as input an encoded scalable bit stream comprising video that encodes both an EL and a BL. BL subsystem 520 may decode video data associated with the BL, and EL subsystem 540 may decode video data associated with the EL. As depicted in FIG. 5, the output of decoder 500 may include a decoded BL bit stream and a decoded EL bit stream. In some embodiments, decoder 500 will provide output in only one of BL format or EL format. For example, if decoder 500 is a legacy decoder that does not support the higher bit depth video associated with the EL, then it may include only BL subsystem 520, in which case the EL portion of the encoded scalable bit stream will be ignored and only BL output will be provided. Alternatively, decoder 500 may support higher bit depth EL video, but output in EL format only, using the BL bit stream produced by BL subsystem 520 internally, for the purpose of inter-layer prediction only.

BL subsystem 520 and EL subsystem 540 may be implemented in hardware, in software, or in combinations of hardware and software. Although BL subsystem 520 and EL subsystem 540 are depicted separately in FIG. 5 for conceptual purposes, they may share certain hardware components or software modules. For example, entropy encoding unit 524 in BL subsystem 520 may be implemented in the same hardware components or software modules as entropy encoding unit 546 of EL subsystem 540.

BL subsystem 520 includes BL extraction unit 522, entropy decoding unit 524, prediction unit 526, and reconstruction and storage unit 528. BL extraction unit 522 receives encoded scalable video information comprising both EL and BL video data as input. BL extraction unit 522 extracts the BL portion of the data, which comprises encoded video samples with a certain bit depth corresponding to base level of video quality. The EL portion of the data, which comprises the additional information necessary to derive enhanced video samples with a higher bit depth, may not be used within BL subsystem 520.

Once the BL data is extracted from the scalable bit stream, it is entropy decoded by entropy decoding unit 524, yielding syntax data as well as quantized transform coefficients representing residual video information, e.g., in a frequency domain. At prediction unit 526, the syntax data is used to generate predicted video blocks or predicted video frames, e.g., by intra-frame (spatial) prediction or inter-frame (motion) prediction. At reconstruction and storage unit 528, the quantized transform coefficients are inverse quantized and inverse transformed, yielding residual information in the sample domain. The residual information is added to the predictions generated by prediction unit 526, yielding reconstructed video frames or pictures that contain video blocks made up of reconstructed BL video samples. A series of these reconstructed video frames constitutes decoded BL video, which is the output of BL subsystem 520. The reconstructed video frames and blocks may then be used by prediction unit 526 to perform additional rounds of prediction. More detailed examples of the processes performed by (1) entropy decoding unit 524; (2) prediction unit 526; and (3) reconstruction and storage unit 528 are provided above with respect to (1) entropy decoding unit 150; (2) motion compensation unit 162 and intra prediction unit 164; and (3) inverse quantization unit 154, inverse transform unit 156, reconstruction unit 158, and decoded picture buffer 160, respectively, of FIG. 3.

As described previously, decoder 500 includes BL subsystem 520 and EL subsystem 540. EL subsystem 540 generates enhanced decoded video by combining enhancement information from the EL portion of the encoded scalable bit stream with predictions generated from the decoded BL video produced by BL subsystem 520. EL subsystem 540 includes inverse mapping unit 542, EL extraction unit 544, entropy decoding unit 546, prediction unit 548, and reconstruction and storage unit 550. EL extraction unit 544 extracts EL data from the encoded scalable bit stream that is received as input to EL subsystem 540. At entropy decoding unit 546, the extracted EL data is entropy decoded, yielding syntax data as well as quantized transform coefficients representing residual video information, e.g., in a frequency domain. The syntax data may be used to generate predicted video frames or video blocks, comprising predicted samples. Predictions may be generated according to an inter-frame prediction mode, an intra-frame prediction mode, or the like, by prediction unit 548. Prediction unit 548 may also use inter-layer prediction provided by inverse mapping unit 542, instead of or in combination with the aforementioned inter-frame and intra-frame prediction. The syntax data provided by entropy decoding unit 546 may specify which prediction mode should be used for each part of an EL video sequence that is decoded by EL subsystem 540.

Inverse mapping unit 542 performs inter-layer prediction in a similar manner to inverse mapping unit 442 of FIG. 4, except that it receives (e.g., determines or extracts) adaptive adjustment parameters from the syntax data provided by entropy encoding unit 546, rather than choosing the parameters based on optimization calculations. Inverse mapping unit 542 does not perform such optimization calculations because it may not have access to the original EL samples that were used to create the encoded EL video data. Conversely, inverse mapping unit 442 of FIG. 4 performs the optimization calculations in order to create the syntax data and make it available to inverse mapping unit 542, or similar inter-layer prediction units in other embodiments of decoder 500.

At reconstruction and storage unit 550, the predictions from prediction unit 548 (possibly comprising inter-layer predictions from inverse mapping unit 542) are combined with residuals in the sample domain. Reconstruction and storage unit 550 determines the residuals by inverse quantizing and inverse transforming the quantized transform coefficients from entropy decoding unit 546. The combination of residuals and predictions yields reconstructed EL video, comprising decoded EL pictures or frames, which is the final output of EL subsystem 540 and decoder 500 as depicted in FIG. 5. More detailed examples concerning certain functionality of decoder 500 are provided above with respect to video decoder 30 of FIGS. 1 and 3.

Figure 6:
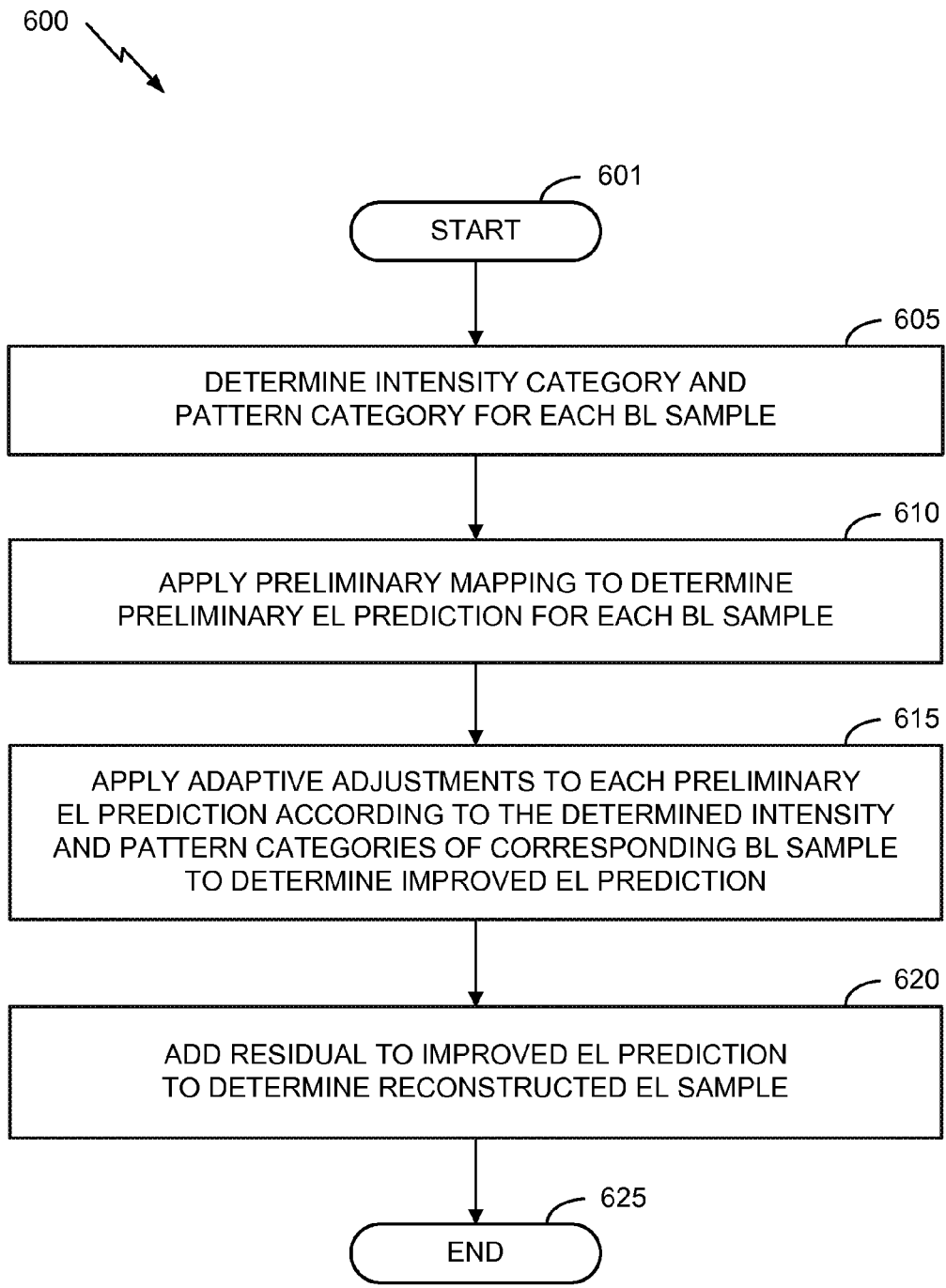
FIG. 6 is a flowchart illustrating an example method for determining predictions of enhancement layer samples having a higher bit depth than corresponding base layer samples according to aspects of this disclosure.

Turning now to FIG. 6, a flowchart illustrating an example method for determining predictions of EL samples from BL samples is provided. Method 600 of FIG. 6 is particularly adapted to the prediction of EL samples having a higher bit depth than corresponding BL samples. In some embodiments, the EL comprises high dynamic range samples capable of representing a greater range of luminance values than corresponding low dynamic range samples in the BL. In other embodiments, the EL comprises chrominance samples capable of representing a wider range of colors than corresponding chrominance samples in the BL. If method 600 is implemented in a video coder (e.g., encoder or decoder) that supports more than one EL and one BL, the steps of method 600 may be interleaved or performed simultaneously with other inter-layer prediction methods. For example, if method 600 is implemented in a video coder (e.g., encoder or decoder) that supports scaling of both bit depth and spatial resolution, any inter-layer prediction steps (such as upsampling) associated with spatial scaling may performed before, during, or after method 600.

For the sake of simplicity, the discussion of method 600 will focus on BL and EL samples that represent luminance values, which may also be referred to as intensity values or intensities. However, persons of skill in the art of video coding will appreciate that techniques of this disclosure which are embodied in method 600 can likewise be applied to samples measuring chrominance or other aspects of a video picture. In addition, the discussion of method 600 will refer to patterns, which may refer to a distribution of relative intensities among a small number of spatially adjacent samples, such as 3 samples arranged in a horizontal, vertical, or diagonal line within a single video block. However, techniques of the present disclosure may be used to select and apply adaptive adjustments based on other sorts of sample distributions as well, such as distributions of involving chrominance samples, distributions of more than 3 samples, distributions of samples not arranged in a single line, distributions of samples in more than one block, and distributions comprising a set of samples selected to be statistically representative of a larger set of samples, such as by random or pseudo-random selection from the larger set.

The steps illustrated in FIG. 6 may be performed by an encoder (e.g., the video encoder as shown in FIG. 2 or FIG. 4), a decoder (e.g., the video decoder as shown in FIG. 3 or FIG. 5), or any other component. For convenience, the steps are described as performed by a coder, which may be the encoder, the decoder or another component.

Method 600 begins at block 601. At block 605, the coder determines an intensity category and a pattern category for each sample in the BL. In some embodiments, the range of possible intensities that can be represented by a BL sample may be divided into a plurality of bands. For example, if a BL sample has a bit depth of 8 bits, it may represent intensity values within a range extending from 0 to 255. This range may be divided into 4 bands of equal size, corresponding to the ranges 0 to 63, 64 to 127, 128 to 191, and 192 to 255. If such bands are used, an intensity category associated with a sample may correspond to the intensity band that the sample is located in. In some embodiments, the defined bands may not fill the entire range of possible sample values, so an additional category may be required for samples that fall outside of the defined bands. In further embodiments, bands may not be uniformly sized. For example, bands may be smaller near the center of the intensity spectrum, in order to allow for more fine-grained adjustments of mid-range samples, which may be particularly advantageous for video in which the overall sample distribution contains a large proportion of mid-range samples. The intensity category may be determined based on the luminance value of the BL sample, the chrominance value(s) of the BL sample, or a combination of the luminance and chrominance values of the BL sample.

A pattern category may be based on, e.g., the BL sample being categorized and a plurality of samples that are adjacent to the categorized sample. For instance, the adjacent samples may include one sample to the left of the categorized sample and one sample to the right of the categorized sample. A first category may be assigned if the intensities of both the right and left samples are greater than the intensity of the categorized sample, while other categories may be assigned for other combinations of relative intensities between the categorized sample and its neighbors. In some embodiments, a pattern category may be determined based on neighboring samples other than those to the left and right, such as those above and below or those which are diagonally situated relative to the categorized sample. As noted above, in some embodiments more than two adjacent samples may be considered, and in other embodiments the considered samples may not be adjacent. A pattern category may also be referred to as a distribution category.

Method 600 continues at block 610, where a preliminary mapping is applied to each of the BL samples that were categorized at block 302. In some embodiments, the preliminary mapping does not take the determined categories into account. It applies a mathematical function or a series of computational operations to a BL sample to determine a preliminary prediction of a corresponding EL sample. In some embodiments, the preliminary mapping may have the effect of increasing the bit depth of the BL sample to the bit depth required of an EL sample. In some embodiments, the preliminary mapping may provide coarser adjustments than the adaptive adjustments that will be discussed below with respect to block 306. For example, the preliminary mapping may involve exponentiation or multiplication, while the adaptive adjustments may involve multiplication or addition. In some embodiments, the preliminary mapping utilizes a look-up table that maps each BL sample value (or a set of values) to the corresponding EL sample value (or a set of values). In some embodiments, the preliminary mapping may be skipped altogether, and the BL sample itself may take the place of the preliminary prediction in later steps of method 600. Additional examples of operations that may be used for preliminary mapping are discussed above in this Detailed Description section, along with relevant considerations for choosing among such operations.

At block 615, the preliminary predictions from block 610 are refined by adjustment operations using adaptive adjustment parameters. One adjustment operation may be performed for each of the categories determined at block 605. For example, if one intensity category and one pattern category were determined for a particular BL sample, then two adjustment operations may be applied to the preliminary prediction derived from that sample. Each adjustment operation will use an adaptive adjustment parameter associated with the corresponding category. In some embodiments, the adjustment operations will be the same for each type of category. For example, the adjustment operation for both the intensity categories and the pattern categories may be multiplication, in which case the preliminary prediction will be multiplied by both the intensity adjustment parameter and the pattern adjustment parameter. Alternatively, different adjustment operations may be used for different types of categories, e.g., multiplication may be used to apply adjustment parameters associated with intensity categories and addition may be used to apply adjustment parameters associated with pattern categories, or vice versa. As discussed above in this Detailed Description section, adjustment parameters may include multiplicative ratios or coefficients, additive or subtractive offsets, or the like. In addition, as discussed previously with respect to inverse mapping units 442 and 542 of FIGS. 4 and 5, adjustment parameters for each category may be chosen (e.g., determined at the time EL video is encoded) to minimize the distortion or error between predicted EL samples and actual EL samples. In some embodiments, a single adjustment parameter will be associated with a single category for all samples in a particular video which fit that category. In other embodiments, however, different adjustment parameters may be associated with the same category for samples in different parts of a video. For example, samples of a first block lying in a particular intensity band may be associated with an adjustment parameter a, while samples of a second block lying in the same intensity band may be associated with an adjustment parameter b, where b is not equal to a. Different adjustment parameters may be associated with a single category not only for different blocks, but also for different groups of blocks, different parts of blocks, different frames, etc. To improve coding efficiency, adjustment parameters for a particular region (e.g., block, frame, etc.) may be predicted from a temporally or spatially proximate region.

At block 620, once the adaptive adjustment parameters are applied to determine refined predictions from the preliminary predictions, residual values may be added to the refined predictions to determine reconstructed EL samples, which are the final product of method 600. The method 600 ends at block 625.

As discussed above, one or more components of video encoder 20 of FIG. 2, video decoder 30 of FIG. 3, video encoder 400 of FIG. 4, or video decoder 500 of FIG. 5 may be used to implement any of the techniques discussed in the present disclosure, such as determining one or more categories for each BL sample, applying a preliminary mapping applying to determine preliminary EL prediction, applying adaptive adjustments to each preliminary EL prediction, and adding residual to improved EL prediction.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus configured to code video data, the apparatus comprising:
   a memory configured to store video data associated with a first layer and a second layer, the first layer including a first layer sample having a first bit depth; and
   a processor in communication with the memory, the processor configured to:
      apply a preliminary mapping function to the first layer sample to produce a preliminary predicted sample;
      determine a first category of the first layer sample based on one or more values with the first layer sample, wherein the first category is based on a comparison between the one or more values associated with the first layer sample and a plurality of bands defined at least by one or more boundary points between adjacent bands in the plurality of bands;
      determine one or more adjustment parameters based on the determined first category of the first layer sample; and
      perform, on the preliminary predicted sample, a piecewise adjustment operation using the one or more adjustment parameters to determine a refined predicted sample, the piecewise adjustment operation comprising one or more of a multiplication, a division, an exponentiation, or a logarithm, the refined predicted sample having a second bit depth that is greater than the first bit depth.

2. The apparatus of claim 1, wherein the first bit depth is 8 bits, and the second bit depth is one of 10 bits, 12 bits, and 14 bits.

3. The apparatus of claim 1, wherein the first category of the first layer sample is determined from one or more luminance or chrominance values of the first layer sample.

4. The apparatus of claim 1, wherein the processor is further configured to determine a second category of the first layer sample based on (i) the one or more values associated with the first layer sample and (ii) one or more values associated with a neighboring sample in the first layer, and to determine one or more additional adjustment parameters based on the determined second category of the first layer sample, wherein the piecewise adjustment operation is further based on the one or more additional adjustment parameters.

5. The apparatus of claim 4, wherein the second category of the first layer sample depends on results of a plurality of comparisons between the first layer sample and other samples which are spatially adjacent to the first layer sample in the video data.

6. The apparatus of claim 1, wherein
   the first layer sample represents a luminance value on a scale of possible luminance values;

the scale of possible luminance values is divided into a plurality of luminance bands;
the luminance value represented by the first layer sample lies within one of the luminance bands; and
the first category of the first layer sample corresponds to the luminance band within which the first layer sample lies.

7. The apparatus of claim 1, wherein
the first layer sample represents a chrominance value on a scale of possible chrominance values;
the scale of possible chrominance values is divided into a plurality of chrominance bands;
the chrominance value represented by the first layer sample lies within one of the chrominance bands; and
the first category of the first layer sample corresponds to the chrominance band within which the first layer sample lies.

8. The apparatus of claim 1, wherein the preliminary mapping function comprises at least one logarithmic or exponential operation.

9. The apparatus of claim 1, wherein the preliminary mapping function comprises a left bit shift or multiplication by a number greater than or equal to 2.

10. The apparatus of claim 1, wherein the preliminary mapping function comprises a look-up table that maps each possible first layer sample value onto a corresponding second layer sample value.

11. The apparatus of claim 1, wherein the preliminary predicted sample has a bit depth equal to the second bit depth.

12. The apparatus of claim 1, wherein the one or more adjustment parameters comprise ratios, coefficients, exponents, or logarithmic bases.

13. The apparatus of claim 1, wherein the piecewise adjustment operation further comprises an addition or a subtraction.

14. The apparatus of claim 1, wherein the processor is further configured to add a residual value to the refined predicted sample to determine a second layer sample.

15. A method of coding video data, the method comprising:
receiving the video data comprising a first layer sample having a first bit depth;
applying a preliminary mapping function to the first layer sample to produce a preliminary predicted sample;
determining a first category of the first layer sample based on one or more values associated with the first layer sample, wherein the first category is based on a comparison between the one or more values associated with the first layer sample and a plurality of bands defined at least by one or more boundary points between adjacent bands in the plurality of bands;
determining one or more adjustment parameters based on the determined first category of the first layer sample; and
performing, on the preliminary predicted sample, a piecewise adjustment operation using the one or more adjustment parameters to determine a refined predicted sample, the piecewise adjustment operation comprising one or more of a multiplication, a division, an exponentiation, or a logarithm, the refined predicted sample having a second bit depth that is greater than the first bit depth.

16. The method of claim 15, wherein the first bit depth is 8 bits, and the second bit depth is one of 10 bits, 12 bits, and 14 bits.

17. The method of claim 15, wherein the first category of the first layer sample is determined from one or more luminance or chrominance values of the first layer sample.

18. The method of claim 15, further comprising determining a second category of the first layer sample based on (i) the one or more values associated with the first layer sample and (ii) one or more values associated with a neighboring sample in the first layer, and determining one or more additional adjustment parameters based on the determined second category of the first layer sample, wherein the piecewise adjustment operation is further based on the one or more additional adjustment parameters.

19. The method of claim 18, wherein the second category of the first layer sample depends on results of a plurality of comparisons between the first layer sample and other samples which are spatially adjacent to the first layer sample in the video data.

20. The method of claim 15, wherein
the first layer sample represents luminance value one a scale of possible luminance values;
the scale of possible luminance values is divided into a plurality of luminance bands;
the luminance value represented by the first layer sample lies within one of the luminance bands; and
the first category of the first layer sample corresponds to the luminance band within which the first layer sample lies.

21. The method of claim 15, wherein
the first layer sample represents a chrominance value on a scale of possible chrominance values;
the scale of possible chrominance values is divided into a plurality of chrominance bands;
the chrominance value represented by the first layer sample lies within one of the chrominance bands; and
the first category of the first layer sample corresponds to the chrominance band within which the first layer sample lies.

22. The method of claim 15, wherein the preliminary mapping function comprises at least one logarithmic or exponential operation.

23. The method of claim 15, wherein the preliminary mapping function comprises a left bit shift or multiplication by a number greater than or equal to 2.

24. The method of claim 15, wherein the preliminary mapping function comprises a look-up table that maps each possible first layer sample value onto a corresponding second layer sample value.

25. The method of claim 15, wherein the preliminary predicted sample has a bit depth equal to the second bit depth.

26. The method of claim 15, wherein the one or more adjustment parameters comprise ratios, coefficients, exponents, or logarithmic bases.

27. The method of claim 15, wherein the piecewise adjustment operation further comprises an addition or a subtraction.

28. The method of claim 15, wherein the processor is further configured to add a residual value to the refined predicted sample to determine a second layer sample.

29. A non-transitory computer readable medium comprising code that, when executed, causes an apparatus to:
receive video data comprising a first layer sample having a first bit depth;
apply a preliminary mapping function to the first layer sample to produce a preliminary predicted sample;
determine a first category of the first layer sample based on one or more values associated with the first layer sample, wherein the first category is based on a comparison between the one or more values associated with the first layer sample and a plurality of bands defined at least by one or more boundary points between adjacent bands in the plurality of bands;

determine one or more adjustment parameters based on the determined first category of the first layer sample; and perform, on the preliminary predicted sample, a piecewise adjustment operation using the one or more adjustment parameters to determine a refined predicted sample, the piecewise adjustment operation comprising one or more of a multiplication, a division, an exponentiation, or a logarithm, the refined predicted sample having a second bit depth that is greater than the first bit depth.

30. A video coding device configured to code video data, the video coding device comprising:

means for receiving the video data comprising a first layer sample having a first bit depth;

means for applying a preliminary mapping function to the first layer sample to produce a preliminary predicted sample;

means for determining a first category of the first layer sample based on one or more values associated with the first layer sample, wherein the first category is based on a comparison between the one or more values associated with the first layer sample and a plurality of bands defined at least by one or more boundary points between adjacent bands in the plurality of bands;

means for determining one or more adjustment parameters based on the determined first category of the first layer sample; and means for performing, on the preliminary predicted sample, a piecewise adjustment operation using the one or more adjustment parameters to determine a refined predicted sample, the piecewise adjustment operation comprising one or more of a multiplication, a division, an exponentiation, or a logarithm, the refined predicted sample having a second bit depth that is greater than the first bit depth.

* * * * *